(12) United States Patent
Cui et al.

(10) Patent No.: US 9,684,886 B2
(45) Date of Patent: Jun. 20, 2017

(54) CROSS-DOMAIN BUSINESS MASHUP INTEGRATION

(75) Inventors: Weiyi Cui, Shanghai (CN); Xiao Xu, Wujiang (CN)

(73) Assignee: SAP SE, Walldorf (DE)

( * ) Notice: Subject to any disclaimer, the term of this patent is extended or adjusted under 35 U.S.C. 154(b) by 856 days.

(21) Appl. No.: 13/572,152

(22) Filed: Aug. 10, 2012

(65) Prior Publication Data

US 2014/0047351 A1 Feb. 13, 2014

(51) Int. Cl.
G06F 3/01 (2006.01)
G06Q 10/10 (2012.01)
G06Q 10/06 (2012.01)

(52) U.S. Cl.
CPC ............ *G06Q 10/10* (2013.01); *G06Q 10/06* (2013.01)

(58) Field of Classification Search
USPC ....... 715/234, 738, 742, 744, 748, 749, 763, 715/765; 707/736, E17.116; 709/203, 709/217, 218, 219, 227; 719/318
See application file for complete search history.

(56) References Cited

U.S. PATENT DOCUMENTS

| | | | |
|---|---|---|---|
| 2002/0049749 A1* | 4/2002 | Helgeson | G06F 9/468 709/203 |
| 2004/0224674 A1* | 11/2004 | O'Farrell et al. | 455/418 |
| 2007/0050340 A1* | 3/2007 | von Kaenel et al. | 707/3 |
| 2007/0150610 A1* | 6/2007 | Vassilev et al. | 709/230 |
| 2008/0077451 A1* | 3/2008 | Anthony et al. | 705/4 |
| 2008/0134211 A1 | 6/2008 | Cui | |
| 2008/0281726 A1* | 11/2008 | Gupta | 705/27 |
| 2010/0228428 A1* | 9/2010 | Harshbarger et al. | 701/33 |
| 2011/0270833 A1* | 11/2011 | von Kaenel et al. | G06F 17/30241 707/736 |
| 2012/0030581 A1 | 2/2012 | Cui et al. | |
| 2012/0030592 A1 | 2/2012 | Cui et al. | |

OTHER PUBLICATIONS

"SAP Business ByDesign—Business Flexibility View", © 2011 SAP AG, (2011), 52 pgs.

* cited by examiner

*Primary Examiner* — Doon Chow
*Assistant Examiner* — Wendy Nicholas
(74) *Attorney, Agent, or Firm* — Schwegman Lundberg & Woessner, P.A.

(57) ABSTRACT

Techniques and configurations for establishing cross-domain communications between a business application, a third party website or service, and mashup components of a mashup user interface are generally described herein. In one example embodiment, a scripting library which establishes socket connections between domains and between components of a common mashup user interface is included or referenced in a mashup component and in a third party component that are displayed in the common browser-based mashup user interface. A scripting library executing in the browser may be used to establish and control the socket connections that communicate changes to the business application data, transmitted from the third party webpage to the mashup. The changes to the business application data, communicated and received in front-end objects, then may be processed or further communicated for persistence at the business application.

16 Claims, 8 Drawing Sheets

CROSS-DOMAIN BUSINESS MASHUP INTEGRATION

FIELD

The present disclosure relates generally to data operations and communications in networked settings. In an example embodiment, the disclosure relates to bidirectional communication techniques in user interface and web-enabled scenarios to enable integration between various types and formats of applications and services.

BACKGROUND

Communications are often exchanged between various types of applications, such as between front-end applications and back-end data services to retrieve and update data. Many approaches to establish a communication channel between a front-end application and the back-end data services that it consumes involve extensive integration and modification to properly handle and process data operations. Such integration to establish a communication channel may be particularly complex in websites and web services settings. For example, processing overhead may be caused by Secure Sockets Layer (SSL) certificate synchronization between the front-end applications and the back-end data services exposed by the web services. As another example, complex processing may be needed to overcome the lack of temporary business object support before modifications to the business object are saved in back-end data services. Existing approaches to modify front-end applications or back-end services do not efficiently or effectively handle common business application transaction use cases and contexts, especially with use of third party services in web settings.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Some of the example embodiments described herein provide a method and system for establishing bidirectional communications of business data between website mashups (or like user interfaces of business applications) and third party services. In one example, a cross-domain JavaScript library is deployed in a browser environment to facilitate a set of front-end, bidirectional communications between a mashup component and a third party website or web service using one or more socket channels. The browser environment may be used to expose business data objects and appropriate context data communicated from the mashup component using socket channels established by a JavaScript or other scripting library, and capture context changes to the business data performed at the third party website. These context changes to the business data then can be transmitted back to the mashup component using the JavaScript or other scripting library.

Components of the mashup user interface, which is operating in communication with the third party website, can persist data changes to the business data occurring at the third party service and communicate these data changes to the back-end application. Accordingly, a variety of partner or third party applications may be integrated into any phase of a business data object or other contextual information that is retrieved from the back-end data services. These partner or third party applications may be used to efficiently and quickly update or otherwise manipulate data in the business data object retrieved from the back-end data services, without back-end connections between the third party website and the business application.

Importantly, the techniques and configurations described herein enable front-end business integration between a business intelligence system (such as data from a customer relationship management (CRM), enterprise resource planning (ERP), or other enterprise data system) and a third party service that is exposed through a web application or other web service consumed in a mashup. Use of a third party service or any accompanying partner application can be integrated into any phase of the business object, to update the business object and produce any business data independently in a more efficient and simplified way upon registration with the mashup. The front-end integration between a business intelligence system and third party services may be used in a variety of application integration, enterprise mashup, and front-end user interface settings, to communicate data between a third party service and a business intelligence system or other back-end data service.

As used herein, the term "business data" generally refers to data that is retrieved from a business intelligence system or service, such as a CRM, ERP, or other enterprise data system or service. Other types of data management systems, data services, and data stores may also serve the role of maintaining or providing business data. Further, business data stored by a business intelligence system or service is not limited to data on a particular commercial enterprise, but may be provided for data on a group of entities, a group of persons, or an individual person (with such data being maintained for either or both of business and non-business purposes). A collection of business data retrieved from a business application is generally referred to herein as a "business data object" and may be provided in any number of proprietary or open interoperable formats (including binary or textual data values). Business data is also generally referred to herein as "contextual information", which refers to business data for a particular business object or entity.

Such business data is generally referred to as being obtained from a "back-end service", in the sense that the service maintaining the data provides responses to the client via a service-oriented architecture (which may be remotely hosted, subject to security or access restrictions, and accessible only through a client interface or client service call). The client may access data from a back-end service via one or more business user interface displays, but the data from a back-end service is typically not accessible or directly communicated to third party services for processing. The present disclosure provides for various configurations of client user interfaces used to interface with the back-end service, communicate business data objects obtained from the back-end service to a third party service, and persist changes to the business data objects occurring at the third party service to the back-end service.

One way to integrate business data with data from third party web service applications is with the use of mashups. A data mashup combines and integrates data from multiple sources into a single integrated tool (e.g., browser-based user interface) accessible by a user. For example, cartographic mapping data from Google Maps® might be combined with addresses of customers or business contacts in a data mashup compilation rendered by a web browser. Such enterprise data mashups may be integrated into a variety of business user interfaces, including business data websites providing dynamic HTML functionality.

In one example, enterprise data mashups are used to integrate data from a business intelligence system (back-end service) with data provided by online, remotely-accessible third party web services or applications. Various users may access the content provided by these web services and applications, and use it in their daily work in combination with business data from the back-end business intelligence system. The data produced in a mashup display may be specific to the client user, a group of users, or an enterprise generally. Enterprise data mashups are not limited to use in standalone pages rendered by desktop web browsers, however, but may be provided in connection with other standalone software applications, remotely hosted applications, mobile-accessed applications, and the like.

Existing HTML/JavaScript applications operating in a web browser are not natively built into a business data context, and generally do not enable interaction between a business application and a third party service that are separately exposed by the HTML/JavaScript applications. The enterprise data mashups described herein can include suitable code to exchange data and context among the consumed mashup components. In one example, HTML/JavaScript applications may be structured to support data exchange functionality in a web-browser-based enterprise data mashup setting. The HTML/JavaScript applications may provide a set of APIs exposed in the enterprise data mashups that are configured to share the business data context, while still permitting free style user interface and behaviors in the mashups. The APIs provided in components of the enterprise data mashups can allow the application to conduct context updates, to post data back to the business application context, and to call external representational state (RESTful) web services.

Accordingly, front-end changes to data at a third party site exposed through one mashup component may be communicated back to other components in the mashup, and persisted by the other components in the mashup to the back-end business application. This multi-application communication enables a cross-domain communication and the persistence of third party service changes to a business data object, through a front-end user interface being accessed by a user.

Figure 1:
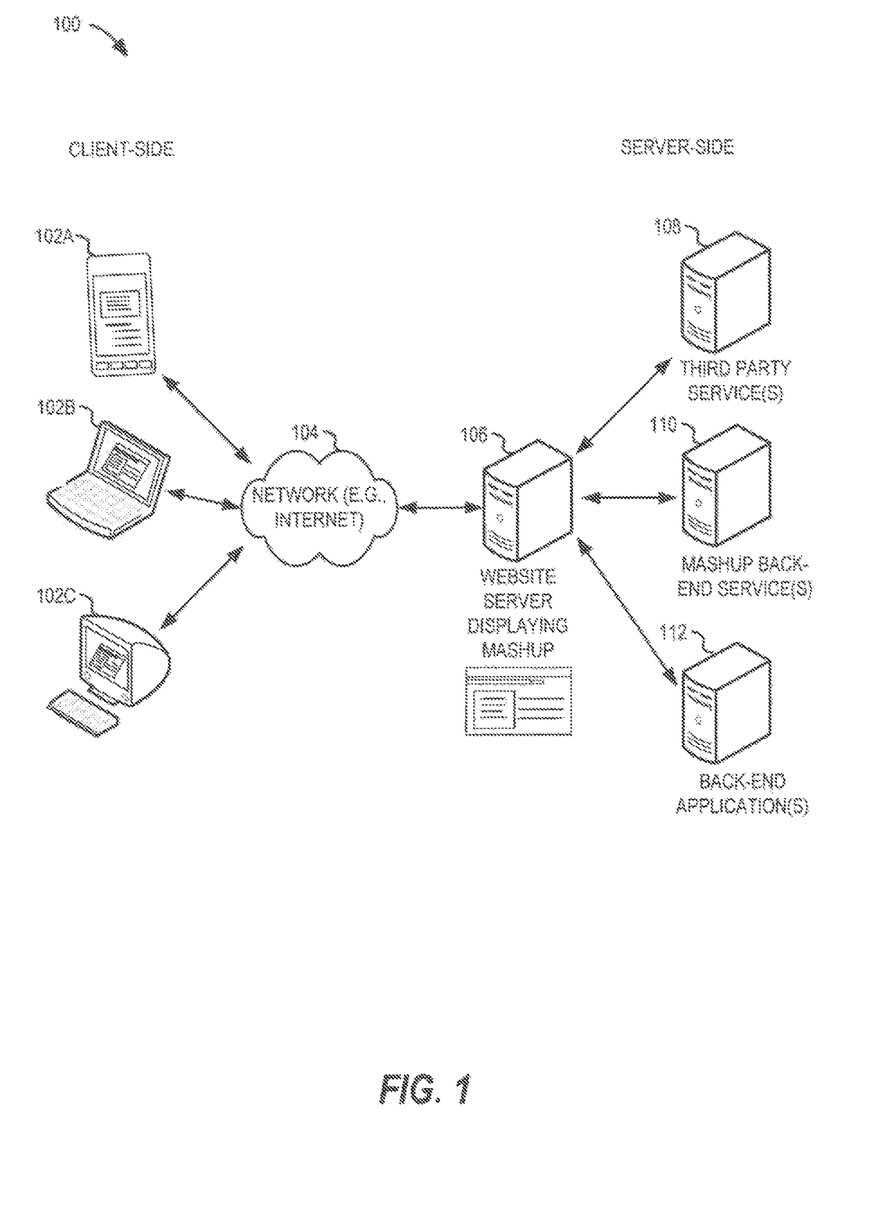
FIG. 1 is a block diagram depicting an architectural overview of a networked system providing a business data mashup integration to clients of a website server, in accordance with an example embodiment.

FIG. 1 is a block diagram depicting an architectural overview of a networked system 100 providing a business data mashup integration to clients 102A, 102B, 102C from a website server 106 via a network (e.g., internet) connection 104 in accordance with an example embodiment. The clients 102A, 102B, 102C may include or be associated with a Web browser to access the website server 106 (and various other services provided by a business process platform) via HyperText Transport Protocol (HTTP) communications. For example, a user may manipulate a browser user interface of one of the clients 102A, 102B, 102C to input an instruction (e.g., "show a sales contact listing in a map"). The website server 106 hosts a website including one or more web pages displaying a mashup of data for access by the user interface of the clients 102A, 102B, 102C, that responds to the instruction. The website server 106 may transmit a corresponding service request (via HTTP or other protocols) to services in the business process platform and to third party services.

Content provided on the mashup webpage hosted by website server 106 may be provided from any number of data sources, and may be managed by a service-oriented architecture. A service-oriented architecture may conduct any processing needed by the request (e.g., generating views and user interfaces) in connection with user request and service capabilities and settings. As illustrated, website server 106 is in network communication with server-side content services including one or more third party services 108, one or more mashup back-end services 110, and one or more back-end applications 112.

After completing the processing, the website server 106 provides a response to clients 102A, 102B, 102C to render and display the mashup user interface. The displayed mashup user interface may be provided to clients with a webpage or web application in a variety of formats and form factors, including formats compliant with a mobile device 102A (e.g., a smartphone or tablet), a portable computer 102B (e.g., a personal computer running Windows or Macintosh), or a non-portable computer 102C (e.g., a network terminal, thin client, or desktop personal computer running any number of operating systems). The clients 102A, 102B, 102C may execute a web client to provide client-side rendering and display of the mashup webpage. Examples of a web client include, but are not limited to any combination of: a Web browser, an execution engine (e.g., JAVA, Flash, Silverlight) to execute associated code in a Web browser, or a dedicated standalone application (which may be integrated into one or more client-side business applications).

The website server 106 may also access data from more than one data source, to allow users access to certain types of information via the mashup display that combines data from multiple sources as a single integrated view or tool. The mashup display provides data from a combination of data generated from the one or more third party services 108, the one or more mashup back-end services 110, and the one or more back-end applications 112. As one example of a client user interface, an enterprise service-oriented architecture may provide users access to information of the service-oriented architecture via a series of web browser-based mashup displays, manipulable through user navigation in the web browser.

Mashup displays can include combinations of third party content and business data, to provide enhanced web searches, company or industry business information, online map searches, and a variety of other applications useful for user interface manipulation. A mashup component might, for example, combine cartographic mapping data from a third party service such as Google Maps® with delivery addresses of outstanding purchase orders retrieved from the back-end applications 112. Other types of mashup components might be associated with, for example, context sensitive Really Simple Syndication (RSS) feed integration, social network integration, data completion via external services, web widgets, or any number of third party services.

Use of a mashup display to combine data from third party services 108 with business data from the back-end applications 112 can be used to combine existing internal data with external services, to create new views, operations, and perspectives of the data. Such a mashup display which combines data from a back-end system (e.g., from the back-end applications 112) with a third party system (e.g., from the third party services 108) is generally referred to herein as a "data mashup" or "enterprise data mashup". It will be appreciated that the output of the data mashup may not directly or exclusively relate to enterprise or business-related data, but may include a variety of personalized or user-driven data. Likewise, while most data originating from the third party services 108 may be generally unrelated to the business enterprise or users, certain data values and representations provided from the third party services 108 may relate to specific enterprises or user-driven data.

As described in further detail herein, the third party services 108 may provide various functionality specific to communication with the mashup, for example to process business data originating from the back-end applications 112 and transmitted through mashup components at the website server 106. The third party services 108 may provide supplemental or replacement content for use in the mashup display through the website server 106, or for consumption by the mashup back-end services 110 or the back-end applications 112.

The mashup back-end services 110 may include various functionality to generate a mashup format, features, and interactivity. For example, the mashup back-end services may be used to dynamically generate widgets, modules, or other components of a mashup display (in a web-parsable format). Accordingly, the mashup back-end services 110 may integrate with design and uses of the website server 106 to efficiently integrate an interactive mashup display into an efficient business user interface.

The back-end application 112 may be used to persist, store, and otherwise manage a variety of types of information on behalf of a business service provider. An enterprise might store and access business information in a number of different ways. For example, an enterprise might store a substantial amount of information about production, sales, human resources, and the like. One or more database structures may be created by a business service provider to persist data in the back-end application 112.

At the back-end application 112, the business service provider might store client or enterprise information into and retrieve client or enterprise information from one or more database structures, such as one or more business data objects. As used herein, a business data object may refer to a set of entities with common characteristics and common behavior representing a defined business semantic. Note that business data may be stored within physical tables of a database or other data store. A database hosting business data may be provided from a relational database such as SAP® MaxDB, Oracle®, Microsoft® SQL Server, IBM® DB2, Teradata® and the like. The database also could be a multi-dimensional database, an eXtendable Markup Language (XML) document, or any other structured data storage system. The physical tables may be distributed among several relational databases, dimensional databases, and/or other data sources.

Any combination of the third party services 108, mashup back-end services 110, or the back-end applications 112 may be provided using one or more cloud or remotely-based services. Likewise, services may be integrated with each other at a common location, including service functionality at the website server 106. For example, the website server 106 may be co-located with the mashup back-end services 110 at the same machine or system.

The mashup display may use a series of RESTful web service communications, specifically HTTP methods (such as GET, POST, PUT, and DELETE), to query and interact with data from the back-end applications 112 and the third party services 108. Therefore, each of the systems 108, 110, 112 may be exposed to the website server 106 and therefore the mashup display as a series of on-demand web services.

Figure 2:
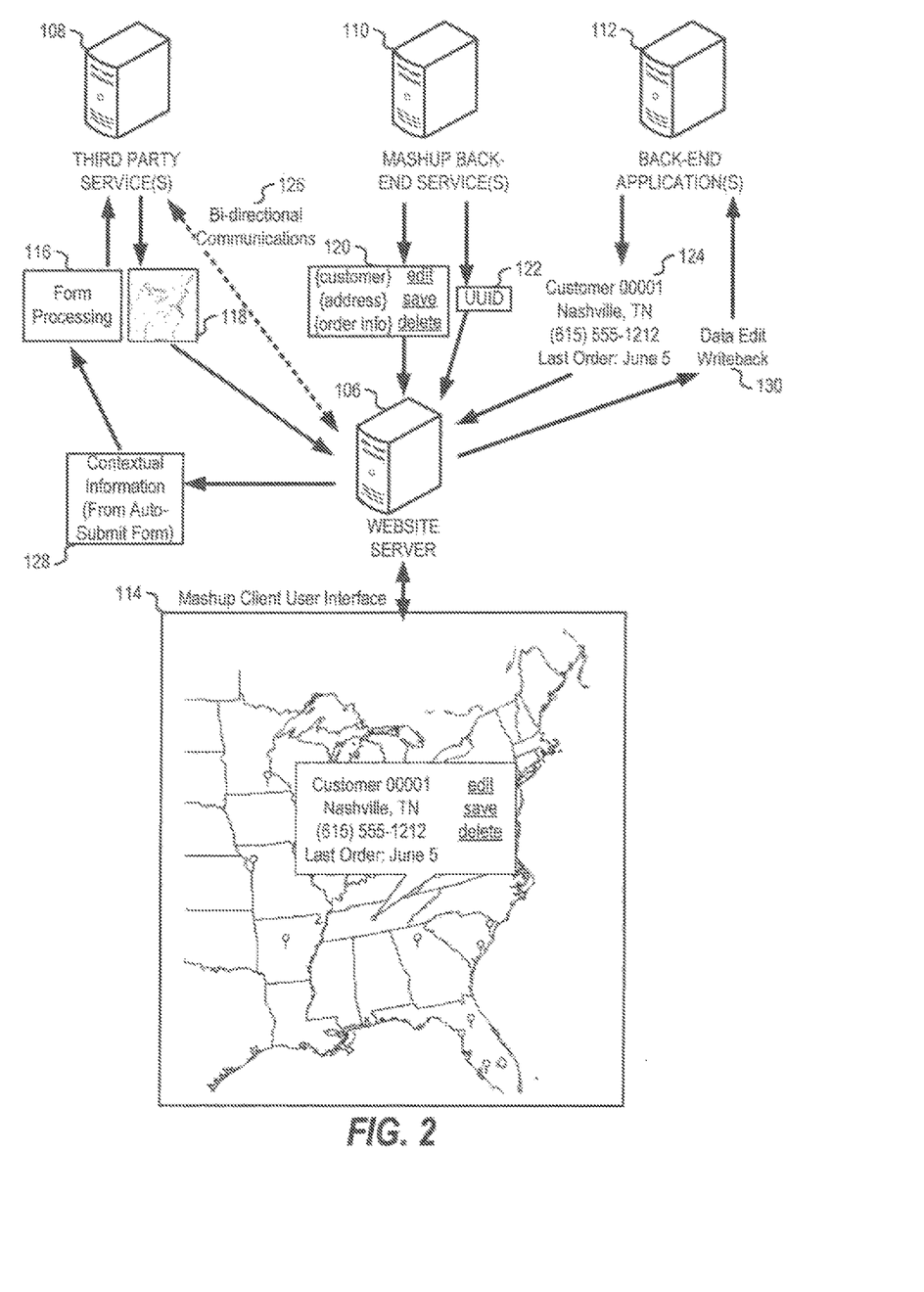
FIG. 2 is a block diagram depicting an overview of data transmission operations between services of a business data mashup integration in accordance with an example embodiment.

FIG. 2 provides an illustration of a mashup user interface 114 produced on a website hosted by the website server 106 (of FIG. 1) in connection with an example embodiment. The mashup user interface 114 provides for the combination, visualization, and aggregation (e.g., the remix or reformatting) of data from the one or more third party services 108 and data from the one or more back-end applications 112, using one or more mashup components generated by the mashup back-end services 110. As further detailed, display components provided in the mashup user interface 114 may be generated by one or more mashup back-end services 110 (such as widget display components customized to the type and format of data retrieved from the back-end applications 112). Portions of one or more of the display components provided in the mashup user interface 114 may also be generated or provided by the third party services 108 or other sources.

The mashup user interface 114 may provide the mashup of data through embedded mashup components that are displayed using a variety of dynamic content techniques, including web pages, embedded frames (iframes), widgets, and other techniques to aggregate data from multiple sources. In some examples, the mashup user interface 114 may be provided through various combinations of displays generated through HTML5, CSS, JavaScript, Ajax, Flash, and Silverlight display technologies, and combinations of client-side and server-side processing.

The mashup user interface 114 may have various "in-ports" to receive data from components and "out-ports" to provide data to components. A particular mashup component may also have in-ports to receive data from other components and out-ports to provide data to other components. A mashup component might be associated with, for example, C#, Extensible Application Markup Language (XAML), HTML, JavaScript, or XML data processing functionality. Moreover, one or more of the mashup components may be provided in an external browser window or be embedded in a webpage (e.g., as an HTML/JavaScript control).

Mashup components displayed in the mashup user interface 114 may be generated or provided by remotely hosted applications, including remotely hosted software provided as a service (SaaS) applications, with varying levels of security capabilities and restrictions. For example, the back-end applications 112 may operate as a SaaS, providing business application data on-demand from one or more of: customer relationship management (CRM) data, financial management data, project management data, supply management data, supplier relationship management data, human resources management data, executive management support data, compliance management data, or enterprise resource planning (ERP) data.

Security capabilities and restrictions may be integrated at the mashup user interface 114, the back-end applications 112, or the mashup back-end services 110. For example, the mashup components and the mashup user interface 114 may perform isolated execution of HTML and JavaScript code received from the third party services 108. Authentication credentials and tokens may also be exchanged among the mashup user interface 114, the back-end applications 112, the mashup back-end services 110, and the third party services 108.

FIG. 2 provides an illustration of example data flows between the various data services and the mashup user interface 114, to provide a mashup of third party and business application data in the mashup user interface 114. It will be understood that the following provides an example of data operations between a web server hosting the mashup user interface 114, and the back-end applications 112, the mashup back-end services 110, and the third party services 108. It will be understood that additional functionality may be localized at the website server 106 hosting the mashup user interface 114, or may be distributed among additional services and processing locations.

The website server 106 hosting the mashup user interface 114 can request and receive data (e.g., business application data 124) from the back-end applications 112. Business application data 124 will be communicated from the website server 106 hosting the mashup user interface 114 to the mashup back-end services 110. The mashup back-end services 110 will temporarily store the business application data retrieved from the back-end applications 112. For example, the business application data 124 may be stored into a back-end table. The mashup back-end services 110 will generate a unique identifier (a UUID 122) to track the business application data 124 within the mashup framework (e.g., the mashup client-side operations). The UUID 122 may be used as a key to gain access to the business application data 124 in this temporary table (e.g., to persist access to the data retrieval for various services and operations). The mashup back-end services 110 therefore may provide a data persistence subsystem used to persist the data to the back-end applications 112 (e.g., to persist the data prior its communication, or to directly communicate the changes to the business application data 124 to back-end applications 112).

The mashup back-end services 110 can also generate components used to communicate appropriate contextual information 128 (e.g., all or a portion of the business application data 124, or related data) to the third party services 108. For example, the mashup back-end services 110 may generate a webpage form that is used to communicate the contextual information 128 to the third party services 108. This contextual information 128 may be communicated automatically upon client-side accesses to the website server 106, through use of an auto-post form. For example, the auto-post form can be automatically posted (submitted) to the third party website upon loading of the mashup in a browser, causing various parameters in the contextual information 128 (e.g., business data context information) to be transmitted to a form processing component 116 of the third party services 108.

A mashup component 120 (e.g., a widget UI for inclusion in a website user interface) also can be generated by the mashup back-end services 110 to expose the business application data (such as the business application data 124), and to combine and display data in a suitable user interface for use in the mashup user interface 114. The mashup component 120 (including HTML, scripting, and other display/rendering properties) is then communicated from the mashup back-end services 110 to the website server 106 for display by the mashup user interface 114.

The mashup user interface 114 may integrate the business application data (such as the business application data 124) with particular formatting of a mashup component 120 and data retrieved from the third party services 108. For example, this data may include graphical data (such as mapping data 118) which is overlaid with the business application data 124 in the mashup component 120 displayed in the mashup user interface 114. When the mashup user interface 114 loads a webpage form at the client browser, the contextual information 128 in the auto-post webpage form will be automatically submitted to the form processing component 116 of the third party services 108.

The third party services 108 will obtain the contextual information (e.g., from the contextual information 128) and process the contextual information to derive needed business application data parameters for the generation and transmission of mashup content. Additional business application data or data objects can be transmitted to the third party services 108 using one or more cross-domain bi-directional communications 126 with the mashup user interface 114. For example, after the third party services 108 performs various operations (e.g., changes, additions) on the received business application data, the operations on the business application data may be communicated back to the website server 106 using the bidirectional communications 126. Even though the third party services 108 are operating on other external systems and at other domains, the bi-directional communications 126 allow exchange of data to and from the mashup user interface 114.

A bi-directional communication library (e.g., a JavaScript library) can be hosted or accessible to both sides (e.g., the website server 106, and the third party services 108) to establish a bidirectional communication channel between mashup components and third party service components. In this fashion, a communication channel can be opened at the client-side (e.g., in the client user interface 114) with scripting to communicate data between the website server 106 and the third party services 108. The bi-directional communication channel allows the third party services 108 to persist changes that may be used to write data back to the mashup back-end services 110 and therefore the linked business application (e.g., the back-end applications 112) in a cross-domain manner. The changes to the business application data also may be received at the website server 106 for further processing, communication, and persistence.

Changes to the business application data received at the website server 106 may be communicated to the back-end applications 112 directly from website server 106, or in connection with the mashup back-end services 110. For example, a data edit writeback operation 130 may be performed to the back-end applications 112 by the website server 106, or may be first filtered through retrieval and processing operations with the mashup back-end services 110. User interface interaction in the mashup user interface 114 may also be used to control data persistence and operations.

Figure 3:
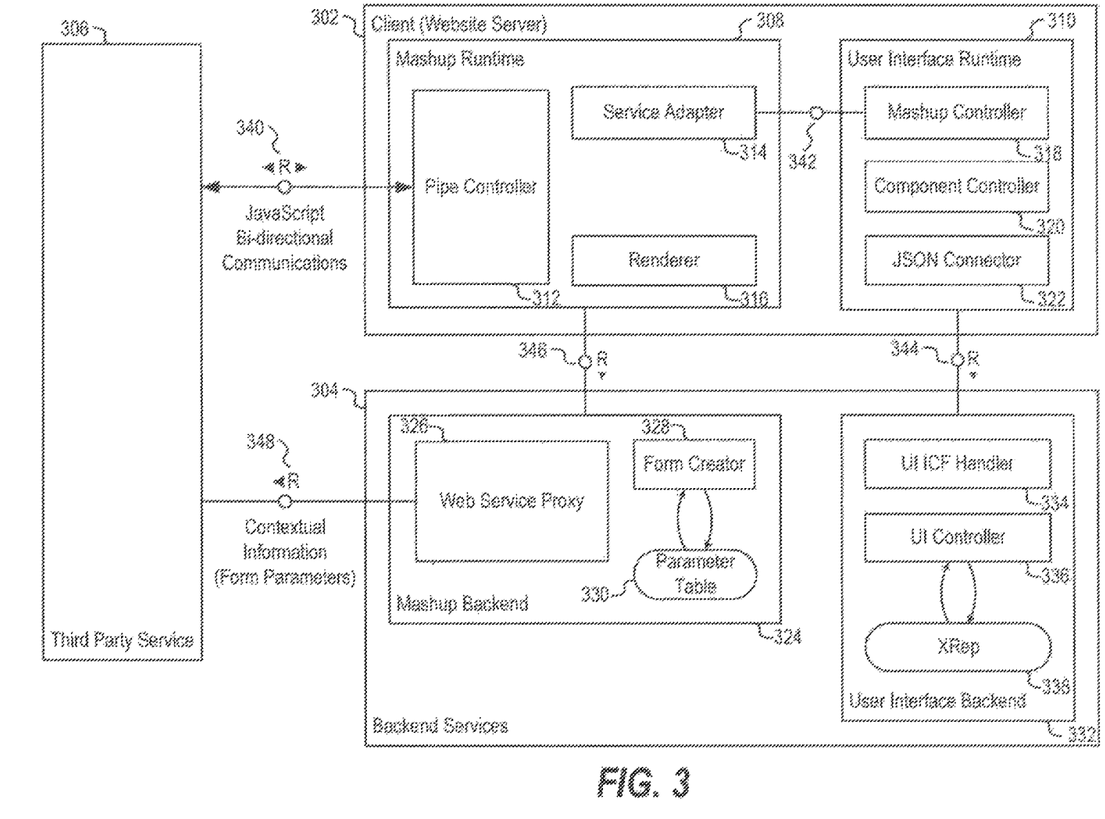
FIG. 3 is an architecture diagram illustrating a configuration of components of a mashup framework communicating with a third party web service, in accordance with an example embodiment.

FIG. 3 is an architecture diagram illustrating a configuration of components of a mashup framework (client-side mashup components 302 and server-side mashup and user interface back-end services 304) communicating with a third party web service 306, in accordance with an example embodiment. FIG. 3 specifically illustrates an overall runtime architecture focusing on the mashup framework, which shows the main components in the mashup and the interactions of these components.

The client-side mashup components 302, for example, may be configured for operation at the website server 106 depicted in FIGS. 1 and 2. The back-end services 304, for example, may be configured for operation at the mashup back-end services 110 depicted in FIGS. 1 and 2. The third party web services 306, for example, may be configured for operation at the third party services 108 depicted in FIGS. 1 and 2.

The client-side mashup components 302 are illustrated as including a mashup runtime 308 and a user interface runtime 310. The user interface runtime 310 is responsible for communicating with a user interface back-end 332 at the back-end services 304 (using communication channel 344).

The mashup runtime 308 is based on a UI runtime framework and controls the life cycle and behavior of mashups, for example to render the mashups in different styles. The mashup runtime 308 also provides functionality to interact with the third party web service 306 bi-directionally (using, for example, JavaScript bi-directional communications 340). The mashup runtime 308 may include a pipe controller 312, service adapter 314, and renderer 316. The pipe controller 312 may be used to facilitate control and operation of JavaScript bi-directional communications 340, and the service adapter 314 may be used to facilitate control and operation of a mashup component provided by user interface runtime 310. The renderer 316 may be used to render and control display of the mashup component at the user interface (e.g., the browser).

The user interface runtime 310 may include a mashup controller 318, component controller 320, and a JSON (JavaScript Object Notation) connector 322. Each of these controllers and connectors are responsible for facilitating interaction and scripting commands with mashup components of the mashup user interface. Accordingly, the user interface runtime 310 controls the behavior of the user interface to the mashup and the business application.

The back-end services 304 include a user interface back-end 332 and a mashup back-end 324. The user interface back-end 332 receives and processes communications from the user interface runtime 310 (using communication channel 344). The user interface back-end 332 provides various functionality for processing web service requests, and serving as the back-end for data processing and persistence of displayed data. The user interface back-end 332 may include various components to assist with communications and communication processing with the user interface, including a user interface internet communication framework (ICF) handler 334. The ICF handler 334 enables use of standard protocols, such as HTTP, HTTPS, and the like between various networked systems. The ICF handler 334 operates in addition to a user interface controller 336, and is responsible for handling all of the requests from the front-end (e.g., the user interface runtime 310) and sending the responses back. All of the UI component metadata are stored and managed by a XResp component 338.

The mashup back-end 324 provides a web service proxy 326 which tunes all of the cross-origin requests and other components. The mashup back-end 324 also provides components to manage the creation of mashups, such as a form creator 328 and a parameter table 330. The mashup back-end 324 receives requests from the mashup runtime 308 (using communication channel 346) to generate mashups. The mashup back-end 324 may provide the context information (e.g., parameters of the business application data) to the third party service 306 in an auto-submit form, or other mechanism (using communication channel 348).

Figure 4:
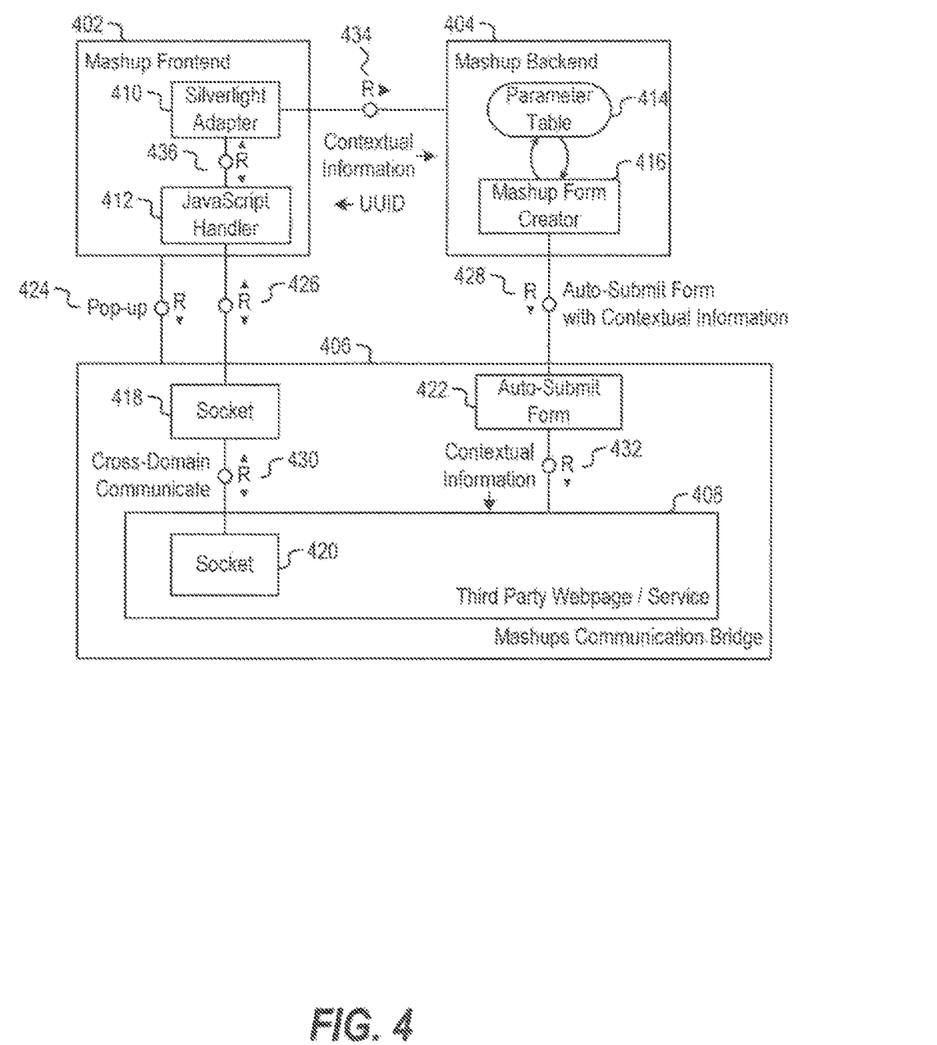
FIG. 4 is an architecture diagram illustrating a configuration of a user interface runtime architecture communicating with a back-end service and a third party web service, in accordance with an example embodiment.

FIG. 4 is an architecture diagram illustrating a configuration of a user interface runtime architecture communicating with back-end services and a third party web service, in accordance with an example embodiment. FIG. 4 specifically illustrates example cross-domain communications (occurring on communication channels 426 and 430) between mashup components (generated by the mashup back-end 404, and displayed by the mashup frontend 402), and the third party webpage or web service 408 (communications with a "mashups communication bridge" 406).

The mashup frontend 402 is responsible for displaying the mashup, and providing functionality to render and interact with one or more mashup components. The mashup frontend 402 may contain various components to provide scripting and other dynamic interaction properties, including a Silverlight adapter 410 and a JavaScript handler 412 (communicating using a communication channel 436).

As illustrated, a series of operations occurs in the mashup framework to provide context for business data operations. First, the mashup frontend 402 will send contextual information, associated with business application data retrieved from the business application, to the mashup back-end 404 (using communication channel 434). The contextual information is used by the mashup back-end 404 to facilitate the storage and processing of business application data, and to generate the appropriate mashup display. The mashup frontend 402 will obtain a UUID back from the mashup back-end 404.

The mashup back-end 404 includes additional functionality to provide the contextual information as appropriate to the third party service 408. For example, the mashup back-end 404 may establish an auto-submit form 422, that is popped up or otherwise opened on the client, to allow the client to load a container page hosted on the same domain as the business application. The container page hosts the auto-submit form 422, that upon loading will submit the contextual information and any other parameters to the third party webpage 408 (for example, through the use of a communication channel 432 established by popup 424 loaded by mashup frontend 402).

Both of the mashup frontend 402 (the container page) and the third party webpage 408 can use bi-directional, cross-domain communications to exchange business application data. For example, a JavaScript library processed by a JavaScript handler (such as the JavaScript handler 412 at the client) may be used to create sockets 418, 420, to perform bidirectional communications via communication channels 426, 430. After the third party service interfaced with by the third party webpage 408 modifies or updates the business application data, the mashup frontend 402 may use the communication channels 426, 430 to receive the updated business application data from the third party webpage 408.

With respect to the system configurations depicted in FIGS. 1-4, it should be appreciated that in other embodiments, the systems and network configurations may include fewer or more components apart from those shown. For example, in example embodiments, the business data services provided in the corporate intranet/back-end applications can be integrated within fewer or additional components. Various of the components and respective modules shown in FIG. 1, FIG. 2, FIG. 3, and FIG. 4 may be in the form of software that is processed by a processor. In another example, some of the components and respective modules shown in FIG. 1, FIG. 2, FIG. 3, and FIG. 4 may be in the form of firmware that is processed by application specific integrated circuits (ASIC), which may be integrated into a circuit board. The components and respective modules shown in FIG. 1, FIG. 2, FIG. 3, and FIG. 4 also may be in the form of one or more logic blocks included in a programmable logic device (for example, a field programmable gate array). The components and respective modules shown in FIG. 1, FIG. 2, FIG. 3, and FIG. 4 may be adapted, and/or additional structures may be provided, to provide alternative or additional functionalities beyond those specifically discussed in reference to FIG. 1, FIG. 2, FIG. 3, and FIG. 4. Examples of such alternative or additional functionalities will be discussed in reference to the flow diagrams and method operations discussed below.

In one example, a cross-domain JavaScript library is deployed at the client user interface front end and the third party webpage to initiate the bi-directional, cross-domain communications via sockets to exchange data. The client user interface front end and the third party webpage are both executed by a client-side interface (e.g., a user-operated web browser), allowing execution of JavaScript or other client-side scripting to be used to communicate data between the mashup user interface components.

The third party webpage or service does not need to directly host the JavaScript library, as a reference to the JavaScript library may be provided to the third party webpage or service through POST or GET HTTP representational state requests. (In this example, however, the third party webpage or service needs to parse the POST parameters received from the mashup to obtain the script URLs, and include them into its HTML output). Thus, the third party may host a Web service which accepts POST or GET HTTP representational state requests for purposes of communicating a location of the bidirectional library. A reference to the JavaScript library may be provided as a URL parameter at the same time that the contextual information is provided.

In one example, the cross-domain JavaScript library may be configured to support both host and guest modes. The library may be provided through the following JavaScript code:

```
function (window, document, location, setInterval, clearInterval)
{
var global = this,
SYN_STR = '<SYN>',
ACK_STR = '<ACK>';
function isHostMethod(object, property) {
var t = typeof object[property];
return t == 'function' ||
(!!(t == 'object' && object[property])) ||
t == 'unknown';
}
var on, un;
if (isHostMethod(window, 'addEventListener')) {
on = function (target, type, listener) {
target.addEventListener(type, listener, false);
};
un = function (target, type, listener, useCapture) {
target.removeEventListener(type, listener, useCapture);
};
} else if (isHostMethod(window, 'attachEvent')) {
on = function (object, sEvent, fpNotify) {
object.attachEvent('on' + sEvent, fpNotify);
};
un = function (object, sEvent, fpNotify) {
object.detachEvent('on' + sEvent, fpNotify);
};
} else {
throw new Error('Browser not supported');
}
//public namespace
global.xdm = {
on: on,
un: un
};
global.xdm.Socket = function (config) {
var remote;
var remoteDomain;
var timer;
var protocol;
var isHost = config.isHost;
var msgCallback = config.onMsg;
var readyCallback = config.onReady;
var targetDoc = config.targetDocument ? config.targetDocument : document;
function syn( ) {
if (!remote) {
alert('host is null');
return;
}
//alert('0.syn sent');
remote.postMessage(SYN_STR, remoteDomain);
}
function hostOnMsg(e) {
if (e.origin != remoteDomain) return;
if (!this.ready && e.data == ACK_STR) {
//alert('2.acked!');
if (timer) {
clearInterval(timer);
}
this.ready = true;
if (readyCallback) {
readyCallback( );
}
}
else if (e.data != ACK_STR) {
if (msgCallback) {
msgCallback(e.data);
}
}
}
function guestOnMsg(e) {
remote = e.source;
remoteDomain = e.origin;
if (!this.ready && e.data == SYN_STR) {
//alert('1.syn received, ack sending');
remote.postMessage(ACK_STR, remoteDomain);
this.ready = true;
if (readyCallback) {
readyCallback( );
}
}
```

```
  else if (e.data != SYN_STR) {
  if (msgCallback) {
  msgCallback(e.data);
  }
  }
}
```

The host may be provided through the following JavaScript code:

```
socket = new xdm.Socket({
isHost: true,
frameId: frame.id, // The id of the iframe which host the remote domain page
remoteDomain: remoteDomain, // The remote domain as the guest socket
onMsg: onPartnerMessage // Respond on the message from the guest
});
```

The guest may be provided through the following javascript code:

```
socket = new xdm.Socket({
onReady: function ( ) {
// do something during xdm.Socket initialization
// is done
},
onMsg: function ( ) {
// basically onMsg is not necessary on Partner side,
// because the Back-end Business App side will not write
// any data to Third Party side through the front-end
}
});
// the JSON data object to pass to Back-end side
// CompanyName & AddressCity are all sample parameters defined
// in the corresponding Mashup OutPort on Back-end side
var data = {
CompanyName: company,
AddressCity: city
};
// the data object to be passed on should be serialized
// to string
socket.postMessage(JSON.stringify(data));
// call this method will automatically close the pop-up window
seconds later
socket.closeWindow( );
```

After the host is initialized, the host will try to connect to the guest, while the guest is still being loaded. Because the host is likely to be hosted in an iframe in the mashup user interface, a timer with 500 ms interval is used to keep pinging the guest (SYN) until the guest socket has been initialized and responds with ACK. When the host and the guest are ready for bi-directional communication, the bi-directional communication itself may be performed via a window.postMessage( ) HTML5 API call.

Figure 5:
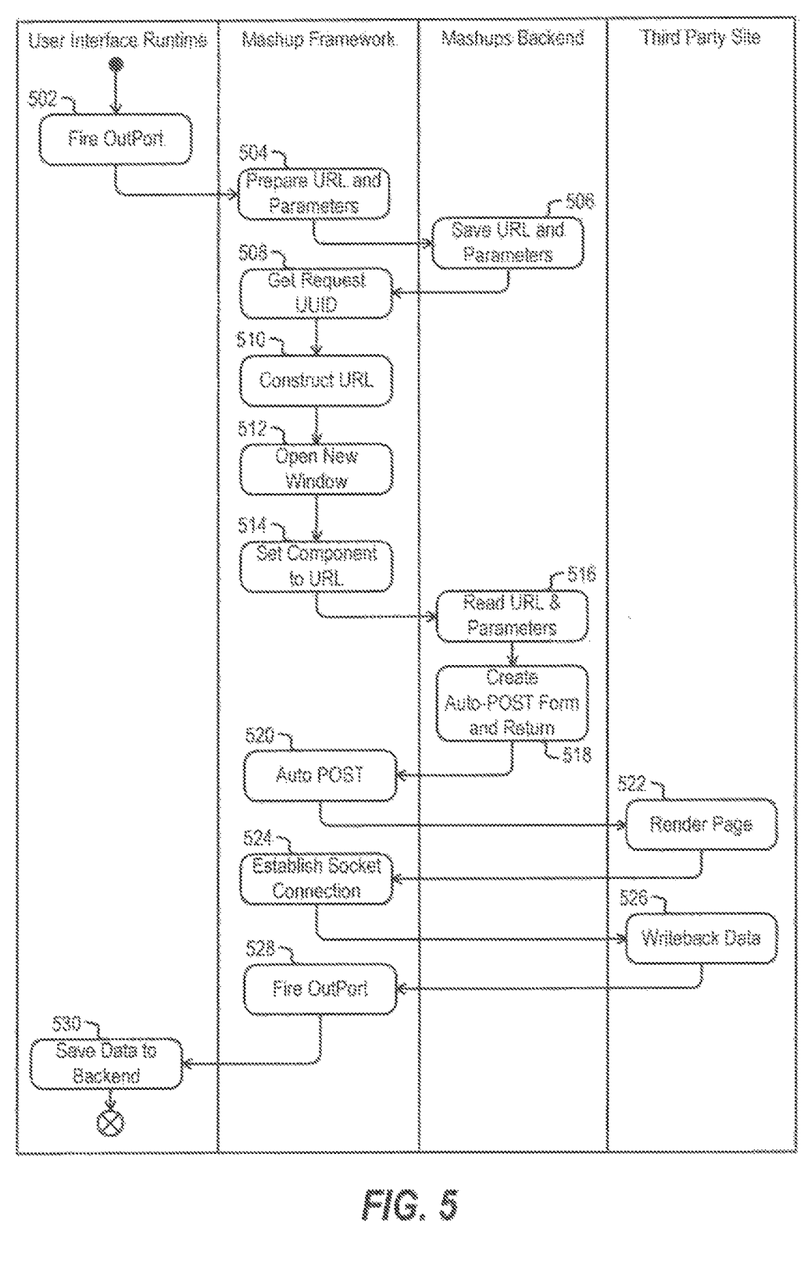
FIG. 5 depicts a flow diagram of a data operation flow for a business application to communicate business data between a mashup and a third party application, in accordance with an example embodiment.

FIG. 5 depicts a flow diagram of a data operation flow for a mashup to communicate a business data object between a mashup framework, mashup back-end, and a third party website. FIG. 5 specifically illustrates an end-to-end method flow for bi-directional communications from the business application side, to the third party website, and back using a webpage-based communication library (e.g., a JavaScript library), facilitating the transfer of data for a data save to the back-end business application.

The mashup will be triggered by the business application for display of the contextual data. The contextual data is provided from an outport of the user interface runtime being fired, in operation 502. This may result from manual or automated actions, during loading of a particular mashup or mashup component, or in response to a specific condition.

The mashup framework (e.g., mashup component operations occurring at a front-end server) will perform the following operations to send the contextual information (e.g., business data) to the mashup back-end for temporary storing, and provide the contextual information to a third party webpage using a pop-up window. A series of communications between the mashup framework, the mashups back-end, and the third party site may be exchanged as follows.

First, the mashup framework may prepare a URL and parameters in the mashup in operation 504, with a request to the mashup back-end to save the URL and parameters in operation 506. The parameters come from the contextual information retrieved from the back-end business application. In operation 506, the URL and parameters are saved in a temporary table. In response, the mashup back-end will return a generated identifier (such as a UUID) that will be used to read back the stored information later.

The mashup framework will obtain the request UUID in operation 508 and construct a URL in operation 510. This URL is provided in some specific pattern or format so that the mashup back-end can recognize it, and read the information stored in the temporary table. The mashup back-end will then produce a form containing this information that can be loaded in the frontend. The mashup framework will open a popup window containing the form in operation 512, and set the mashup component to the appropriate URL to load the popup window webpage in operation 514 (e.g., by setting an iframe to load the appropriate URL). This results in causing the mashups back-end to read the URL and parameters in operation 516, and create an auto-post form in operation 518.

Next, once the form is loaded to the frontend, the data (e.g., the URL and parameters stored in the temporary table) are already there. In operation 520, the form will be automatically posted to the third party website, and the parameters from business context will then be sent to the third party website.

The third party website will render the page in operation 522, for example by parsing the script URL, and send a HTML response which provides reference to the JavaScript library. The mashup framework can then establish a socket connection in operation 524 with the third party site. The third party application will write back to the mashup JavaScript side via the cross-domain socket in operation 526. Finally, the mashup framework can fire an outport in operation 528, to cause the user interface runtime to save the data to the back-end in operation 530 (as the mashup will forward the result to the business application for persistence).

Figure 6:
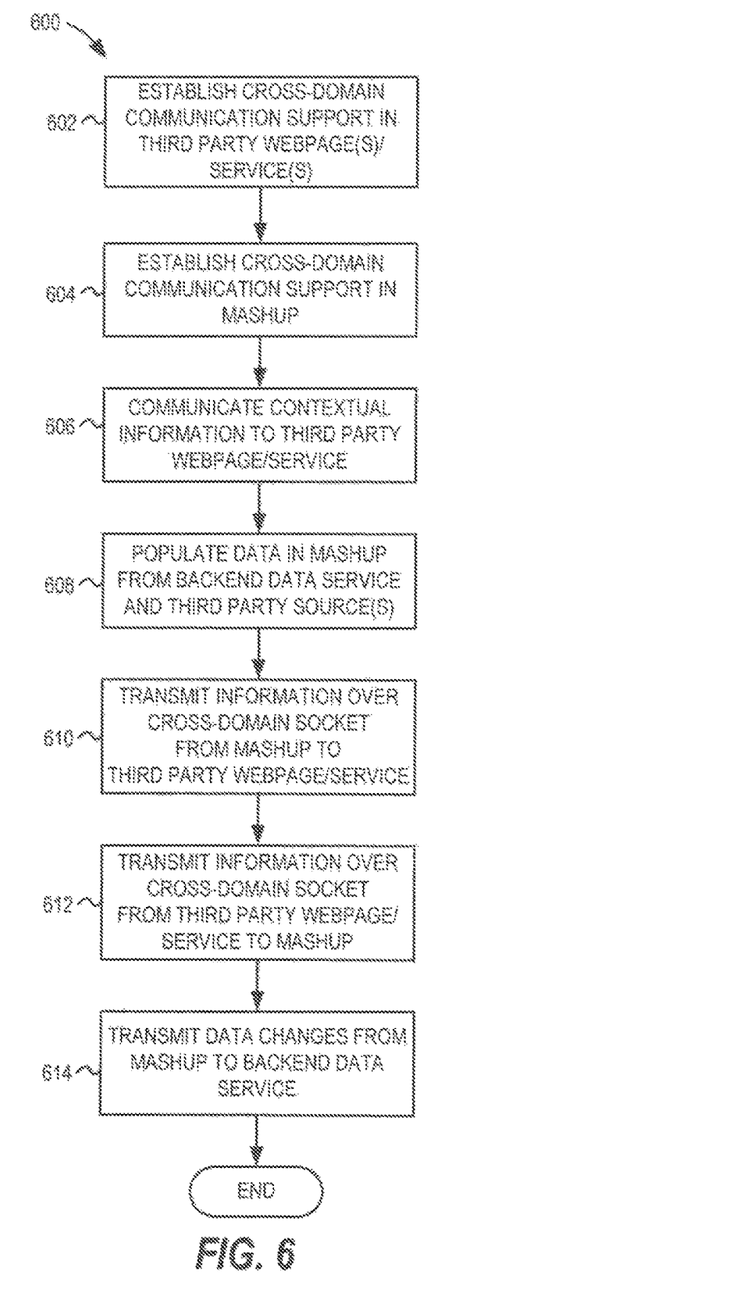
FIG. 6 depicts a flow diagram for a general overview of a method for facilitating communication in a business data mashup integration, in accordance with an example embodiment.

FIG. 6 depicts a flow diagram of a general overview of a method 600 for performing bi-directional communications with a business data mashup integration, in accordance with an example embodiment. The method 600 may begin at operation 602 by establishing cross-domain communication support in a third party webpage or service. For example, this may be performed by the third party webpage or service being configured to support and host a JavaScript library. This may also be performed by the third party webpage or service receiving one or more POST or GET parameters, to indicate the location of the JavaScript library hosted remotely (followed by the third party webpage or service referencing this remotely hosted library in its output).

The method 600 may continue at operation 604 by establishing cross-domain communication support in a mashup framework (such as a mashup component or mashup user interface). For example, the cross-domain communication support may be performed by the inclusion or reference of a JavaScript library into HTML rendered by a back-end component.

In operation 606, various types of contextual information are communicated to a third party webpage or service. This contextual information may include all or select portions of the business application data retrieved from the back-end business application. In operation 608, data is populated in the mashup framework from one or both of the back-end data service (i.e., the business application) and the third party sources. This data may be used for direct display in the mashup, or for further processing (such as using data retrieved from one third party data source, to retrieve data from a second third party data source).

In operation 610, business application data and other information is transmitted from the mashup to the third party webpage using a cross-domain socket, established through use of a bidirectional library hosted or referenced by the mashup user interface. For example, a bidirectional scripting library executing through use of a web browser may establish a socket from the mashup to communicate the business application data to the third party webpage.

In operation 612, a modified version of the business application data and other information is transmitted from the third party webpage to the mashup using a cross-domain socket, established through use of a bidirectional library hosted or referenced by the third party webpage.

Upon receipt of the data changes to the business application data at the mashup, further processing may be performed. The data may be selected for persistence by a user, or automatically persisted, for saving at the back-end data service (e.g., the business application). In operation 614, the data changes are transmitted from the mashup to the back-end data service.

Figure 7:
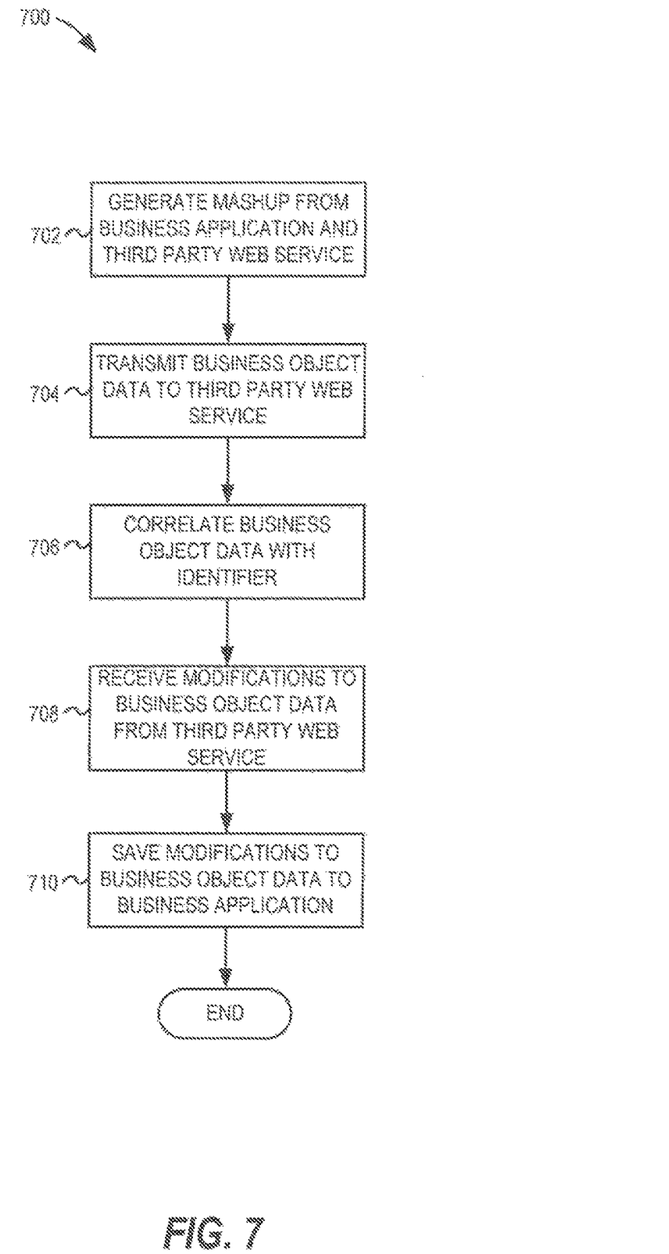
FIG. 7 depicts a flow diagram for a general overview of a method for facilitating communication between a third party web service and a mashup web service, in accordance with an example embodiment.

Referring to FIG. 7, a method 700 for facilitating communication between a third party web service and a mashup web service may be performed by a web server or other service which generates a customizable and programmatic mashup user interface for one or more users. The method 700 may begin at operation 702, which includes generating a mashup user interface using data from a business application, a third party web service, and potentially other sources. Back-end processing may be used to generate one or more mashup components provided in the mashup user interface.

Operation 704 includes transmitting the business object data to the third party web service. This may be performed using a bidirectional communication library using a communication channel opened at the mashup user interface (for example, using a JavaScript communication library as described above). This may also be performed with contextual parameters of the business object data that are provided to a webpage of the third party web service from an auto-post form.

Operation 706 includes correlating a business data object with an identifier, such as an UUID. The UUID serves as an internal ID used in the mashup framework to identify the business data object (or other contextual information) received from the business application. This UUID generally is not visible to the third party or other external service providers.

Operation 708 includes receiving, at the mashup user interface, the modifications to the business object data received from the third party web service. The modifications may be received at the mashup user interface using the bidirectional communication library using a communication channel opened at a user interface provided by the third party web service (for example, using the JavaScript communication library as described above embedded in a web page generated by the third party web service). These modifications may be further filtered, evaluated, or otherwise processed by the mashup user interface.

At operation 710, modifications to the business object data may be saved to the business application as appropriate. Communication channels may be opened from the web server (or the mashup framework, or the mashup back-end) to the business application to directly persist this data.

It will be understood that various modifications to the order or performance of the sequence of illustrated steps of methods 600 or 700 may result in the same or different result. Further, although method 600 may be performed in connection with the communication technique of method 700, it will be apparent that the method 600 may be performed separately or in connection with other communication techniques.

Figure 8:
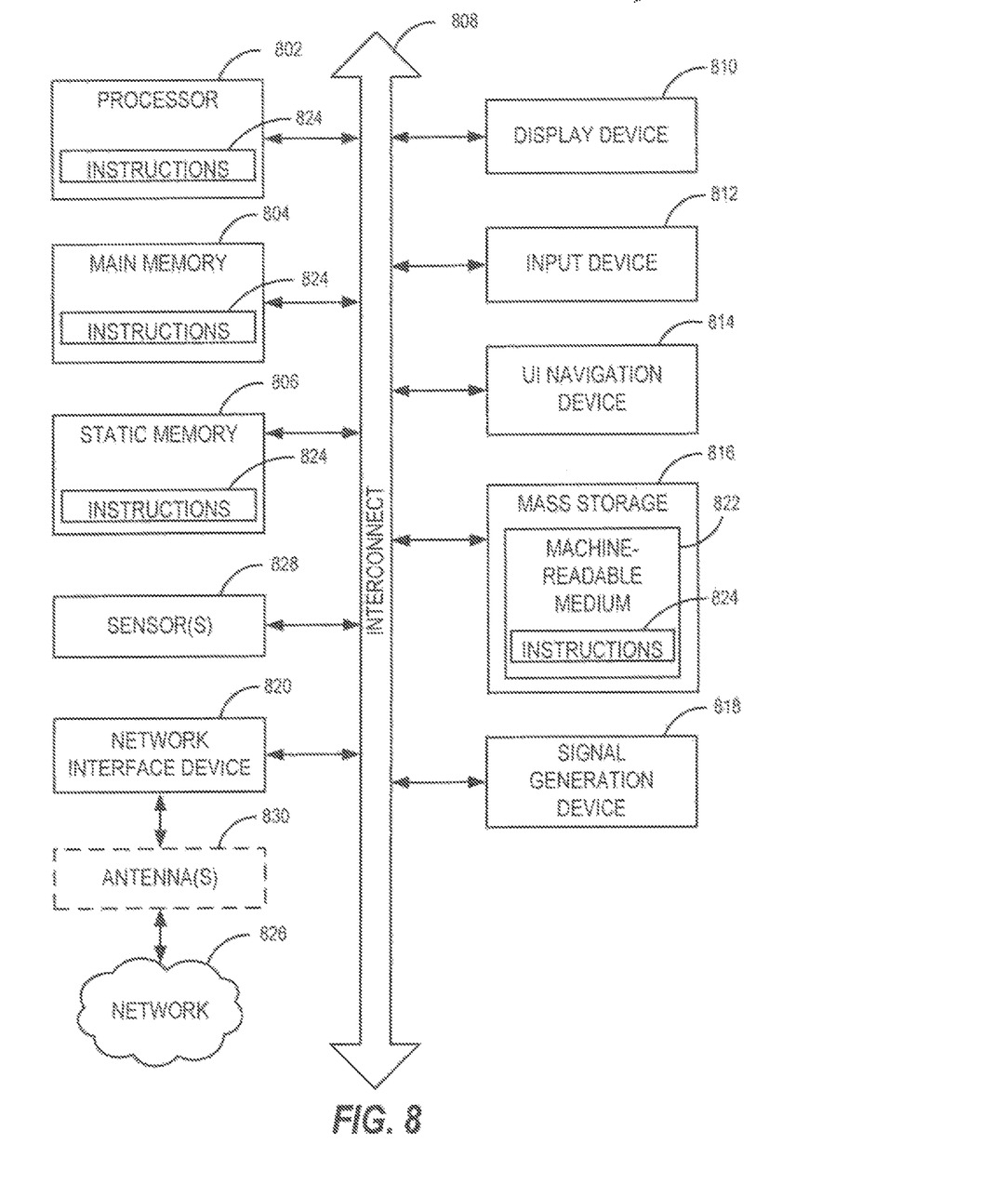
FIG. 8 is a block diagram depicting a machine in the example form of a computing device within which may be executed a set of instructions for causing the machine to perform any one or more of the methodologies discussed herein.

FIG. 8 depicts a block diagram of a machine in the example form of a computing device 800 within which may be executed a set of instructions 824 for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment.

The machine is capable of executing a set of instructions 824 (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the computing device 800 includes a processor 802 (e.g., a central processing unit (CPU), a graphics processing unit (GPU) or both), a main memory 804 (e.g., random access memory), and static memory 806 (e.g., static random-access memory), which communicate with each other via interconnect (e.g., bus) 808. The computing device 800 may further include video display device 810 (e.g., a plasma display, a liquid crystal display (LCD) or a cathode ray tube (CRT)). The computing device 800 also includes an alphanumeric input device 812 (e.g., a keyboard), a user interface (UI) navigation device 814 (e.g., a mouse), a disk drive unit 816, a signal generation device 818 (e.g., a speaker), and a network interface device 820.

The mass storage unit 816 (e.g., a disk drive or other type of non-volatile memory storage) includes a machine-readable medium 822 on which is stored one or more sets of data structures and instructions 824 (e.g., software) embodying or utilized by any one or more of the methodologies or functions described herein. The data structures and instructions 824 may also reside, completely or at least partially, within the main memory 804 and/or within the processor 802 during execution thereof by computing device 800, with the main memory 804 and processor 802 also constituting machine-readable, tangible media.

The data structures and instructions 824 may further be transmitted or received over a computer network 826 via network interface device 820 utilizing any one of a number of well-known transfer protocols (e.g., HTTP). The network interface device 820 may include or operably communicate with one or more antennas 830, transceivers, or other wireless communications hardware to facilitate the connection with the computer network 826.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., the computing device 800) or one or more hardware modules of a computer system (e.g., a processor 802 or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor 802 or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor 802 configured using software, the general-purpose processor 802 may be configured as respective different hardware modules at different times. Software may accordingly configure a processor 802, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors 802 that are temporarily configured (e.g., by software) or permanently configured to perform the relevant operations. Whether temporarily or permanently configured, such processors 802 may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors 802 or processor-implemented modules. The performance of certain of the operations may be distributed among the one or more processors 802, not only residing within a single machine, but deployed across a number of machines. In some example embodiments, the processors 802 may be located in a single location (e.g., within a home environment, an office environment or as a server farm), while in other embodiments the processors 802 may be distributed across a number of locations.

While the embodiment(s) is (are) described with reference to various implementations and exploitations, it will be understood that these embodiments are illustrative and that the scope of the embodiment(s) is not limited to them. In general, techniques for data searches using context information may be implemented with facilities consistent with any hardware system or hardware systems defined herein. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the embodiment(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the embodiment(s).

What is claimed is:

1. A method for facilitating bidirectional communication of business data between computing systems coupled to a network and including at least one processor, the method comprising:

generating a compilation of mashup data for display by a browser-renderable mashup user interface, the mashup data including business object data from a business application and third party data from a third party web service;

transmitting contextual information to the third party web service, the contextual information associated with the business object data being provided from the business application;

receiving modifications to the business object data at the mashup user interface, via a cross-domain socket connection established with the third party web service, the cross-domain socket connection used to transmit the modifications to the business object data from the third party web service to the mashup user interface; and persisting the modifications to the business object data, received at the mashup user interface, to the business application.

2. The method of claim 1, wherein the cross-domain socket connection is established using a JavaScript library, the JavaScript library being referenced by the third party web service and the mashup user interface.

3. The method of claim 2, further comprising:
transmitting additional business object data from the mashup user interface to the third party web service, via a second cross-domain socket connection established by the mashup user interface, the second cross-domain socket connection used to transmit the additional business object data, wherein the additional business object data is correlated to the business object data using the contextual information, and wherein the second cross-domain socket connection is created using the JavaScript library.

4. The method of claim 2, wherein a location of the JavaScript library being referenced by the third party web service is provided to the third party web service using a GET or POST HyperText Transmit Protocol (HTTP) request.

5. The method of claim 1, wherein transmitting contextual information to the third party web service includes transmitting the contextual information from the mashup user interface to the third party web service using an auto-POST form included in a pop-up window launched in the mashup user interface by the browser.

6. The method of claim 1, wherein the business object data is stored at a mashup back-end service and associated with a unique identifier, the unique identifier being used to associate the contextual information with the business object data.

7. The method of claim 1, wherein the mashup user interface includes one or more mashup components for display in the browser, the one or more mashup components consuming at least a portion of the business object data and the third party data provided respectively from the business application and the third party web service.

8. The method of claim 7, further comprising:
generating the one or more mashup components at a mashup back-end service, the one or more mashup components used for display of the compilation of mashup data in the mashup user interface; and
generating the contextual information, at the mashup back-end service, from the business object data provided from the business application.

9. The method of claim 8, wherein the one or more mashup components are provided to the browser in a HyperText Markup Language version 5 (HTML5)-standard format, and wherein the cross-domain socket connection is established using a JavaScript library referenced by the one or more mashup components and the third party web service.

10. The method of claim 1, wherein the business application is an on-demand Software-as-a-Service (SaaS) system, providing one or more of: customer relationship management (CRM) data, financial management data, project management data, supply management data, supplier relationship management data, human resources management data, executive management support data, compliance management data, or enterprise resource planning (ERP) data.

11. A system comprising:
a back-end application server configured to provide business application data;
a mashup back-end server configured to generate one or more mashup components;
a data persistence subsystem configured to persist changes to the business application data to the back-end application server; and
a website server configured to generate a browser-renderable mashup user interface displaying the one or more mashup components, the one or more mashup components configured to integrate the business application data from the back-end application server with third party data from at least one third party service;
wherein the one or more mashup components are configured to exchange bidirectional communications across website domains with the third party service, the bidirectional communications used to transfer data between the one or more mashup components and one or more third party mashup components provided by the third party service;
wherein the bidirectional communications are performed using at least one cross-domain socket connection established by use of a common JavaScript library accessible by the one or more mashup components and the one or more third party mashup components; and
wherein the at least one cross-domain socket connection includes socket connections established by a first socket connection from the one or more mashup components used to communicate additional business application data to the one or more third party mashup components, and a second socket connection from the one or more third party mashup components used to communicate changes of the business application data to the one or more mashup components.

12. The system of claim 11, wherein the mashup back-end server includes a form creator, the form creator configured to create an auto-submit webpage form for inclusion in the browser-renderable mashup user interface, the auto-submit webpage form configured to provide contextual information associated with the business application data to the third party service.

13. The system of claim 11, wherein the JavaScript library is hosted by the website server and is referenced by the one or more mashup components and the one or more third party mashup components.

14. A non-transitory, computer-readable storage medium that stores instructions, which, when performed by a computer, cause the computer to perform operations comprising:
generating a compilation of mashup data for display by a browser-renderable mashup user interface, the mashup data including business object data from a business application and third party data from a third party web service;
transmitting contextual information to the third party web service, the contextual information associated with the business object data being provided from the business application;
receiving modifications to the business object data at the mashup user interface, via a cross-domain socket connection established with the third party web service, the cross-domain socket connection used to transmit the modifications to the business object data from the third party web service to the mashup user interface; and
persisting the modifications to the business object data, received at the mashup user interface, by communicating the modifications to the business application.

15. The non-transitory computer-readable storage medium of claim 14, further comprising instructions which cause the computer to perform operations including:
referencing, from the mashup user interface, a bi-directional communication library providing one or more JavaScript functions to establish and control the cross-domain socket connection; and providing, to the third party web service, a reference to the bi-directional communication library providing the one or more JavaScript functions;

wherein the cross-domain socket connection is created by invoking the one or more JavaScript functions from the mashup user interface and the third party web service.

16. The non-transitory computer-readable storage medium of claim 15, wherein transmitting contextual information to the third party web service includes transmitting the contextual information from the mashup user interface to the third party web service using an auto-POST form included in a pop-up window launched in the mashup user interface by a browser.

\* \* \* \* \*